Nov. 28, 1950      R. T. BURNETT      2,531,669
ACCUMULATOR VALVE

Filed Feb. 14, 1945      3 Sheets-Sheet 1

INVENTOR
RICHARD T. BURNETT
BY
ATTORNEY

Nov. 28, 1950 R. T. BURNETT 2,531,669
ACCUMULATOR VALVE
Filed Feb. 14, 1945 3 Sheets-Sheet 2
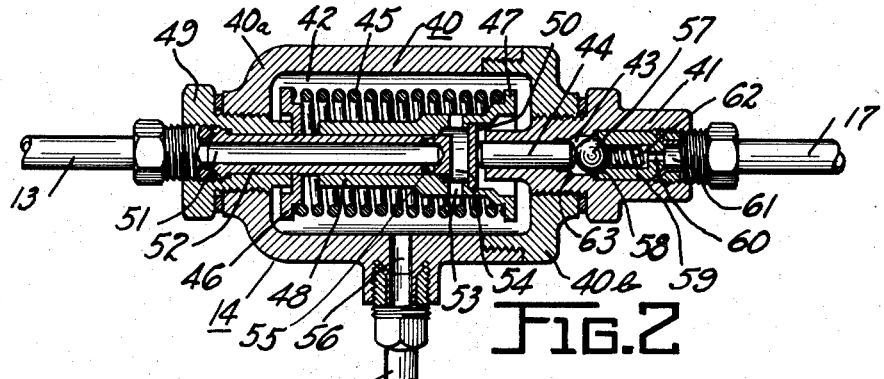
FIG. 2
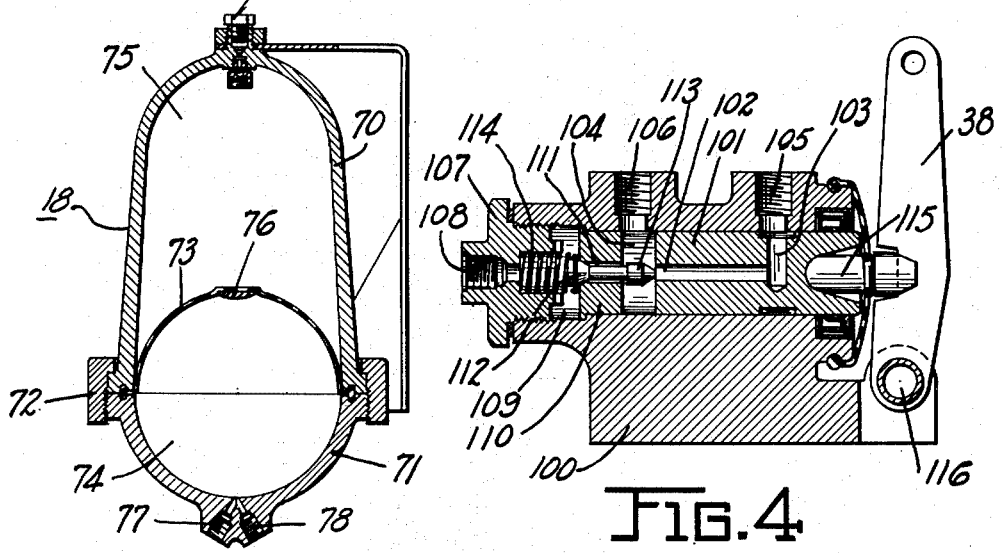
FIG. 3
FIG. 4
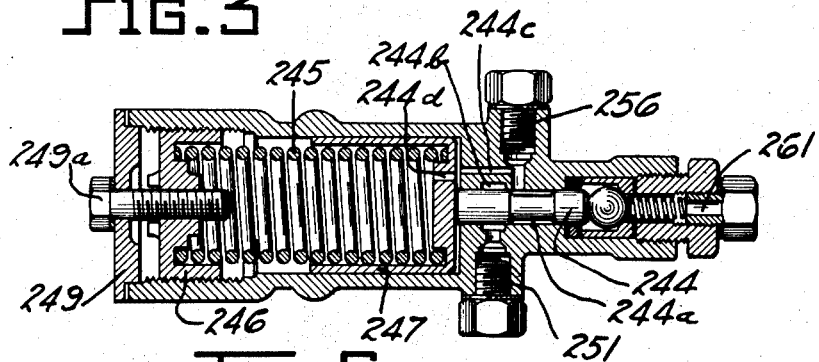
FIG. 5
INVENTOR
RICHARD T. BURNETT
BY
ATTORNEY Nov. 28, 1950 — R. T. BURNETT — 2,531,669
ACCUMULATOR VALVE
Filed Feb. 14, 1945 — 3 Sheets-Sheet 3

INVENTOR
RICHARD T. BURNETT
BY M. C. McConkey
ATTORNEY

Patented Nov. 28, 1950

2,531,669

UNITED STATES PATENT OFFICE 2,531,669

ACCUMULATOR VALVE

Richard T. Burnett, South Bend, Ind., assignor to Bendix Aviation Corporation, South Bend, Ind., a corporation of Delaware Application February 14, 1945, Serial No. 577,873

12 Claims. (Cl. 137—153)

This invention relates to fluid pressure controls and particularly to controls of the type wherein fluid under pressure is stored pending its employment in the operation of a controlled motor. This is a continuation of my application Serial No. 406,671, filed August 31, 1941, and now abandoned.

Fluid pressure systems of the type illustrated in connection with this application, commonly known as accumulator systems, customarily utilize a device called an accumulator for storing pressure fluid until the said fluid is needed in the actuation of a controlled motor. To place the fluid in the system under pressure a pump of some sort is ordinarily placed in the fluid line in a position to force fluid into an enclosed chamber in the accumulator. Obviously, there is the possibility that the pump will overload the accumulator unless some limit is placed on the amount of pressure that may be exerted on the accumulator fluid.

Inasmuch as the accumulator is to be at times connected to a controlled motor for actuating the motor by means of the flow of pressure fluid from the accumulator, it is necessary that a certain minimum amount of pressure be maintained at all times in the accumulator so that the motor may be actuated whenever such actuation is desired.

It is an object of my invention to provide means for setting a lower and an upper limit between which the pressure in an accumulator will normally be maintained.

The above object may be accomplished either by utilizing a pump which ceases its pumping effort whenever a predetermined pressure in the accumulator is reached, or by utilizing a pump which is operative continuously, regardless of pressure in the accumulator, so long as some condition maintains, as, for example, the operation of a vehicle engine or the movement of a vehicle body. When a pump of the latter type is used, it is desirable to provide that, whenever the pressure in the accumulator reaches a predetermined maximum, the pump will be allowed to discharge to a reservoir under atmospheric pressure or otherwise to discharge in such a manner that it will not be loaded by the pressure of the fluid in the accumulator. The pump in such case is not continuously operating under load, but instead is subject to negligible resistances whenever its effort is no longer needed to build up pressure in the accumulator.

It is, therefore, a second object of my invention to provide a fluid pressure system which utilizes a continuously operating pump, but substantially relieves the pump of load whenever sufficient pressure has been accumulated.

If a simple relief valve is used which opens to relieve accumulator pressure whenever that pressure exceeds a certain amount and closes immediately upon reduction of the pressure below that amount, the pump will never be relieved from operating against the full accumulator pressure.

Accordingly, it is a further object of my invention to provide a by-pass valve device which will serve to maintain the accumulator pressure within a definite pressure range, but which will not peg the pressure at substantially constant value. Thus the said valve device will serve to disconnect the pump from an accumulator and connect it to a by-pass at a maximum pressure, e. g., 1800 lbs. per square inch and will serve to disconnect the pump from the by-pass and connect it to the accumulator at a minimum pressure, e. g., 1500 lbs. per square inch.

Some of the other objects of my device are as follows:

To provide a fluid pressure system of the accumulator type in which leakage of fluid is prevented by positive sealing methods, particularly leakage of fluid from the accumulator or storage tank which maintains the pressure; to design a valve for an accumulator system of such effectiveness and reliability that the vehicle on which it is installed may stand for a long period of time without loss of fluid and without substantial reduction of accumulator pressure; and to avoid the use of rubber parts in an accumulator system regulator valve.

Other objects, advantages, and desirable features of my invention will become apparent during the course of the ensuing description in which reference will be had to the accompanying drawings.

In the drawings:

Figure 2 is a vertical section taken through the by-pass or regulator valve device of Figure 1;

Figure 3 is a vertical section taken through the accumulator of Figure 1;

Figure 4 is a vertical section taken through the control valve of Figure 1;

Figure 5 is a vertical section through a regulator valve device which is a modification of the device of Figure 2;

Figure 1:
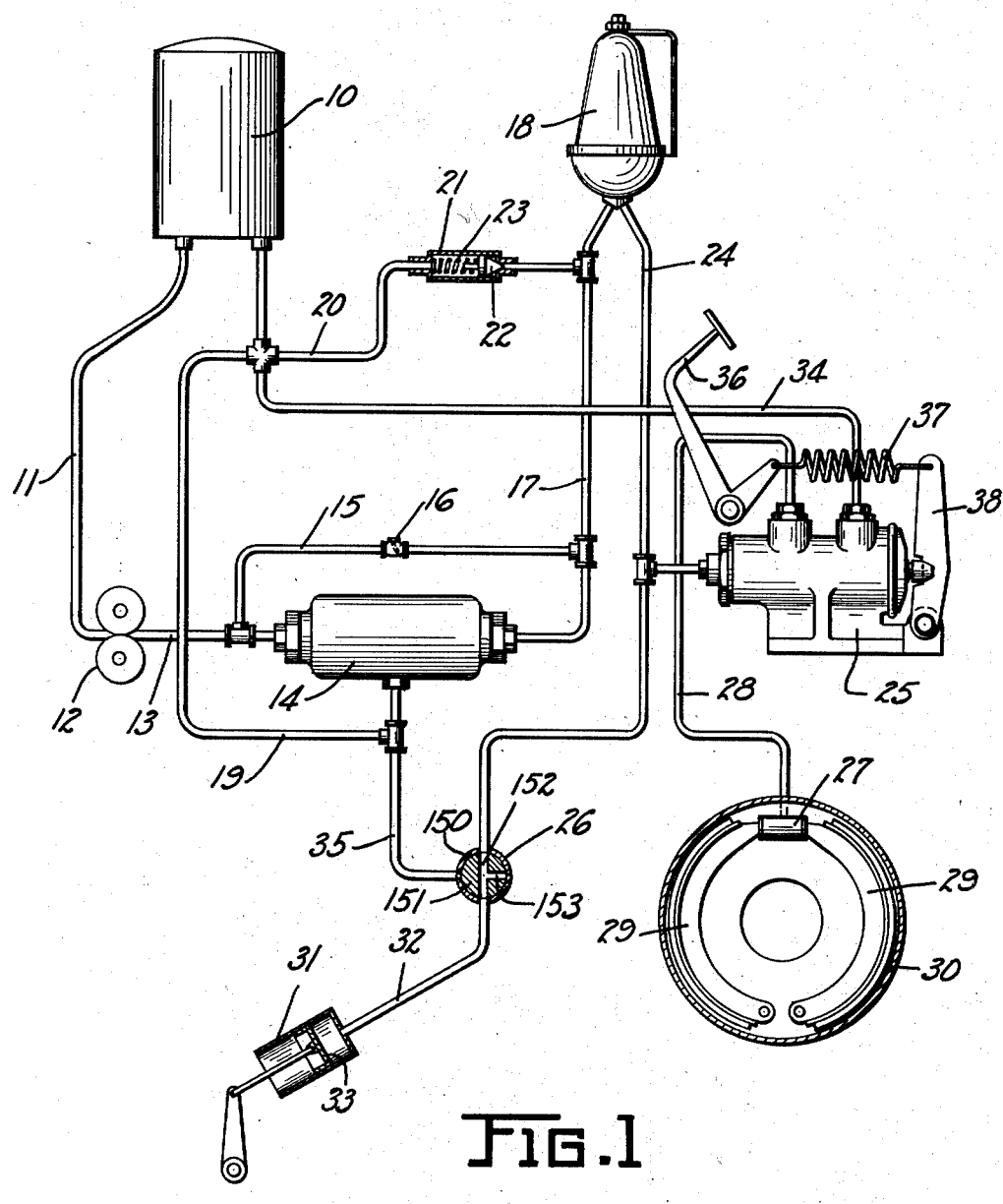
Figure 1 is a diagrammatic view of a fluid pressure control system used as a background for the illustration of my invention.

The fluid pressure system of Figure 1 includes a reservoir 10 for maintaining a quantity of fluid. The fluid in the reservoir will normally be maintained at atmospheric pressure, though the pressure may be varied without affecting the operation of the units hereinafter described. A conduit 11 connects the reservoir to a pump 12 which is adapted to draw fluid from the reservoir and to force it under pressure into a conduit 13 which may carry the fluid from the pump either to a by-pass valve device or regulator valve 14 or through a branch conduit 15 and past a check valve 16 to an accumulator conduit 17. The pump may be of any desired or suitable type as, for example, a gear pump, a reciprocating piston pump or a rotary vane pump. The pump may be continuously driven by being connected to a vehicle propeller shaft or to any suitable moving part of an internal combustion engine in a vehicle.

The accumulator conduit 17 is adapted to conduct fluid from the pump to an accumulator or storage tank device 18 and simultaneously to the by-pass valve device 14 at one side thereof. A conduit 19 connects the by-pass valve device 14 to the reservoir 10, while a conduit 20 connects the accumulator 18 to the reservoir, a pressure relief valve 21 being interposed in the said conduit 20. The pressure relief valve 21 comprises a valve member 22 urged to close the conduit 20 by a spring 23. If the accumulator pressure should become dangerously high through accident or malfunctioning of other elements of the system fluid may escape to the reservoir through conduit 20 and relief valve 21.

The parts thus far described constitute the pressure building and maintaining portions of my liquid pressure system. The remaining parts constitute the devices which utilize the pressure stored in the accumulator in the operation of one or more fluid pressure motors.

As shown the accumulator is connected by a conduit 24 to a control valve device 25 and to a three-way valve 26. Any number of valves such as 25 and 26 may be connected to the accumulator or pressure storage tank to operate any number of motors. In this instance, I have illustrated a fluid cylinder 27 connected to the valve device 25 by a conduit 28 and arranged to spread brake shoes 29 against a brake drum 30 whenever fluid under pressure is admitted to the said cylinder 27. I have likewise illustrated a fluid motor 31 connected by a conduit 32 to the valve 26, the said motor 31 having a piston 33 which may be caused by fluid pressure to transmit force to any suitable linkage. The valve device 25 is connected by an exhaust conduit 34 to the reservoir 10 and the valve 26 is connected through an exhaust conduit 35 to the said reservoir. A pedal 36 is secured through a tension spring 37 to a lever 38 for operating the valve device 25.

It will be apparent that there are numerous uses to which fluid motors as 27 and 31 may be put. They may be utilized to control clutches, brakes, throttles, gearshifters, door openers, or the like on automotive vehicles or to control brakes, ailerons, flaps, rudders or the like on aircraft. In addition to the uses above described and suggested there are many others to which a fluid system of the type disclosed may be put.

Figure 6:
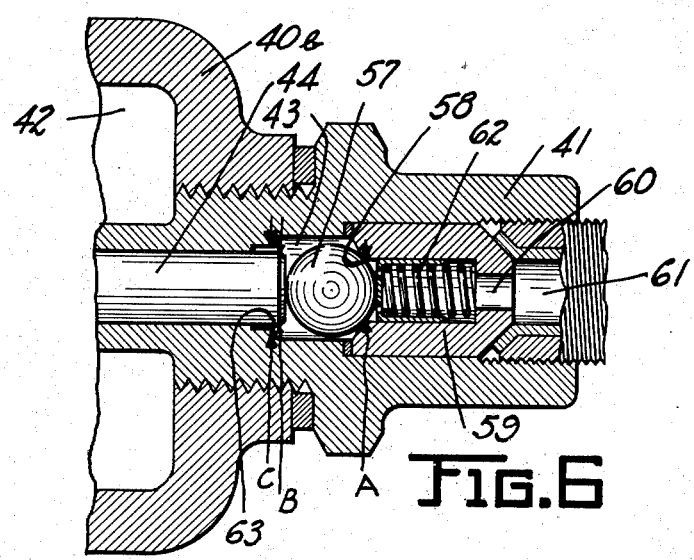
Figure 6 is a close-up showing in section certain important parts of the valve device of Figure 2.

The by-pass valve device 14 is shown in Figures 2 and 6. As shown, it comprises a main casing 40 formed in two parts 40a and 40b and an auxiliary casing 41 screwed into one end of the main casing 40. The casing 40 has a spring chamber 42 in the interior thereof while the casing 41 has a fluid chamber 43 in the interior thereof. A plunger 44, which is also termed a pressure responsive device and a pressure or thrust transmitting element, extends at one end into the spring chamber 42 and at the other end into the fluid chamber 43, the said plunger being adapted to be acted on by opposing forces in the said chambers as will hereinafter appear. In the chamber 42, a compression spring 45 bears at one end against a plate 46 and at the other end against a flange 47 extending from an outer sleeve 48. The plate 46 is supported by a plug 49 screwed into the end of the casing 40. Force exerted by the spring is transmitted through the outer sleeve 48 and through a plate 50 to apply against one end of the plunger 44 (the left end as shown). An inlet port 51 at one side of the casing 40 communicates through the conduit 13 with the pump 12 and communicates with the interior of an inner sleeve 52 which extends into the chamber 42 and extends inside the outer sleeve 48. A plurality of ports 53 are provided in the outer sleeve 48 for establishing communication between a chamber 54 in the interior of the outer sleeve and the chamber 42. A plurality of ports 55 are provided in the inner sleeve 52 so that the interior of sleeve 52 at times communicates with the chamber 54 and thus through the ports 53 with the chamber 42. The chamber 42 has an outlet port 56 which opens into the conduit 19 leading to the reservoir.

The end of the plunger 44 which extends into the fluid chamber 43 abuts against the ball valve member or pressure responsive device 57 which is adapted to move back and forth inside the chamber 43. The ball valve member 57 is at times held by the plunger 44 against a valve seat 58 provided at one end of an annular valve member 59. The valve member 59 has an opening 60 which connects the interior of the valve member 59 and one side of the ball valve 57 with a port 61 in the casing 41, said port 61 being open to the conduit 17 which leads to the accumulator 18. A spring 62 is compressed between the ball valve member 57 and the base of the annular valve member 59 so that said spring tends to move the ball valve member in the direction of the plunger 44. On the side of the chamber 43 opposite the valve member 59 and adjacent the plunger 44 a valve seat 63 is provided in the casing 41. When the plunger 44 has moved sufficiently far to the left, the ball valve member 57 under the influence of the spring 62 will be seated against the valve seat 63. It is to be noted that the inner diameter of the valve seat 58 is less than the diameter of the plunger 44, and that the diameter of the plunger 44 is in turn less than the inner diameter of the valve seat 63. Stated another way, the effective diameter of the valve seat 58 is less than the effective diameter of the plunger 44, which in turn is less than the effective diameter of the valve seat 63. In referring to the effective diameter of these parts, I have reference to the diameter upon which a fluid under pressure may act tending to move the component parts of the regulator valve 14. In speaking of effective valve seat area, I am referring to the area into which pressure cannot pass when the pressure is holding the valve seated and beyond which pressure cannot pass when the pressure tends to unseat the valve. It is important that these diameters be maintained in the proper relationship as will hereinafter be explained. In Figure 6, I have shown an arrow marked A to indicate the diameter across the mouth of the valve seat 58, a second arrow marked B to indicate the diameter across the face of the plunger 44, and a third arrow marked C to indicate the diameter across the mouth of the valve seat 63. It will be noted that C is greater than B which in turn is greater than A. Since the total fluid pressure acting in a given direction against a curved surface depends on the area of a plane which is perpendicular to the direction of the pressure and which has boundaries corresponding to the boundaries of the surface on which the pressure act, it will be apparent that fluid pressure entering the casing 41 from the conduit 17 will have different total effects toward moving the plunger 44 to the left depending upon whether the said fluid pressure is being exerted against the ball valve member when it is seated at 58, against the face of the plunger when the ball valve member is not seated, or against the ball valve member when it is seated at 63.

Figures 8, 9:
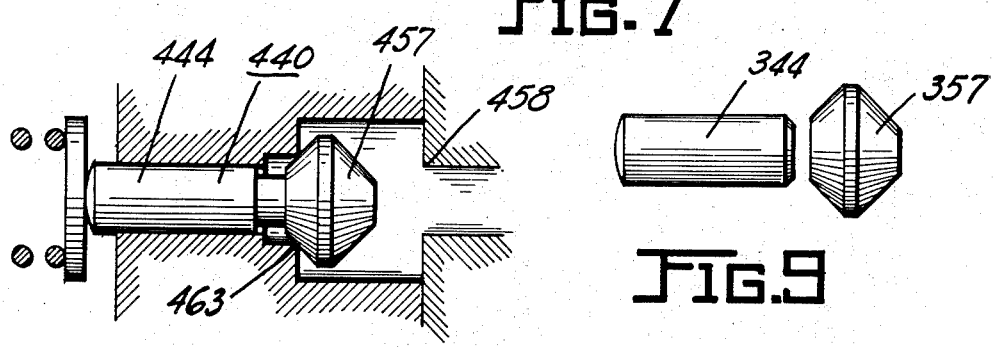
Figure 8 is a vertical section through a modified regulator valve device showing the control unit of the valve device as a single member.
Figure 9 is a view of the movable valve device per se showing a further modification thereof.

Fundamentally the valve member which moves from one valve seat to the other and the piston or plunger should be considered as a single member or movable unit. By separating the said unit into a plunger 44 and a ball 57, it is possible to make the valve seating faces self-aligning with the valve seats. This same result could be attained by a plunger bearing against a double cone, as illustrated in Figure 9. In Figure 9, a double cone valve member 357 is adapted to bear against a plunger 344 which is similar to the plunger 44.

In Figure 8, I have illustrated a valve unit in which the valve member and the plunger constitute a single part. In the said Figure 8, a movable valve control unit 440 comprises a body or plunger portion 444 and a head or valve member portion 457. The casing in which the movable valve control unit 440 is inserted provides differential diameter valve seats 458 and 463 for the head or valve member portion 457 of the valve unit 440. It will be noted that, during the time the head portion 457 is unseated fluid pressure entering from the right or accumulator side will be effective against an area having a diameter equal to the diameter of the body portion 444, the diameter of the body portion being intermediate in size between the effective diameters of the valve seats 458 and 463. Operation of the device illustrated in Figure 8 will be the same as operation of the device illustrated in Figures 2 and 6, and detailed description of the said operation will not be made here.

Inasmuch as I have provided a valve of a type which is capable of closely fitting its valve seats, and since, during times when the accumulator pressure fluctuates between minimum and maximum, there will be an excess of pressure tending to hold the valve closed, an effective seal is provided by the ball valve member at all times. The valve is, therefore, in effect a poppet type valve which is pressure sealed. Any leakage that may occur past the plunger 44 will occur only on the pump side of the valve, and the accumulator pressure being safeguarded against leakage at all times. In order that the valve seats 58 and 63 may support the valve member 57 without danger of crushing the valve seats, I find it advisable to lap the valve into each seat to a slight extent. This is accomplished by rotating the ball on the valve seat until frictional contact has established a bearing surface between the valve and valve seat.

It will be noted that I have eliminated the use of rubber parts as component parts of my regulator valve. It has been found that rubber has a tendency if left in the same position for a considerable length of time under pressure to bond itself to the metal container or cylinder with which it is associated. Since there is a possibility that a valve of the type I have disclosed might be unused for some length of time, it is probably, advantageous to avoid the use of rubber parts.

The accumulator or fluid pressure storage tank device 18 comprises a shell formed of shell members 70 and 71 held together, as by an annular nut 72, and having clamped therebetween the periphery of a diaphragm 73 made of rubber, neoprene or other flexible material. The diaphragm 73 forms a chamber 74 with one end of the shell and a chamber 75 with the other end of the shell. In the center of the diaphragm is a metal piece 76 vulcanized or otherwise secured to the diaphragm. The chamber 74 is connected through an inlet 77 with the pressure maintaining part of the system including the relief valve 21, the pump and the regulating or by-pass valve 14, and through an outlet 78 with the pressure distributing side of the system including valves 25 and 26. The chamber 75 is adapted to be filled through a valve 79 with a gas under pressure as, for example, nitrogen, air, or any inert gas. The compressed gas in chamber 75 is adapted to exert pressure through the diaphragm 73 on the fluid in chamber 74 to create and maintain the accumulator pressure which serves to operate the motor or motors of my fluid pressure system. The diaphragm is not intended to stretch under the influence of opposing pressures but it is merely to serve as a wall between the gas chamber and the fluid chamber and to thus prevent the gas from dissolving in the fluid. It is a well-known fact that when gas under high pressure is brought into contact with fluid, there is a strong tendency for the gas to dissolve in the fluid. It is my purpose to prevent this by using the diaphragm 73 and to likewise allow the size of the chambers 74 and 75 to be varied with the flexible wall or diaphragm moving up or down in the accumulator in accordance with the varying sizes of the chambers. Although the accumulator may be made in any size or shape, I have found it desirable to make it in the pear shape shown.

A possible range of pressures for accumulator use lies between 1500 lbs. per square inch and 1800 lbs. per square inch. This means that it may be desirable to maintain the accumulator pressure between these approximate pressures. Assuming that there is no fluid in the chamber 74 and that the diaphragm is at the bottom of the chamber adjacent the opening 77 and 78, I may desire to compress the gas in chamber 75 to approximately a pressure of 1200 lbs. per square inch. Now, assuming further that the volume of the chamber 74 when the diaphragm is in its uppermost position as shown in Figure 3, is approximately one-third the total interior volume of the accumulator, it will be apparent that, when chamber 74 is full-size as shown in Figure 3, the gas in chamber 75 will be compressed into a volume two-thirds that of the volume occupied by the gas occupied with the chamber 74 was empty. Since the pressure of a given amount of gas is inversely proportional to the volume occupied, the pressure of gas in chamber 75 when the chamber 74 is full of fluid will be approximately 1800 lbs. per square inch if the original gas pressure was 1200 lbs. as assumed. If the accumulator pressure is to fluctuate between the 1500 lbs. and 1800 lbs., the size of the chamber 74 will fluctuate between full-size and half-size. Obviously any fluid forced into chamber 74 through inlet 77 by the pump 12 will be under a pressure equal to that prevailing in chamber 75. Whenever it is wished to utilize this pressure fluid, the fluid may be taken through outlet 78 to the motors which are to be operated.

It is possible that my fluid pressure system may utilize either a fluid of the compressible type as air or a fluid of the incompressible type as oil. The accumulator illustrated may be used to place under pressure a fluid of either type. In other words, chamber 74 may contain either a liquid under pressure or a compressed gas such as air. The principles of my invention may be utilized in a fluid pressure system having compressed air as the actuating fluid. However, since it is likely that fluid of the substantially incompressible type will be found more desirable for a system of the type disclosed herein, the said accumulator is particularly adapted to accommodate fluid of the latter type.

The control valve 25 comprises, as shown in Figure 4, a casing 100 having a plunger 101 reciprocable therein. The plunger 101 has a longitudinal passage 102 and a transverse passage 103 which intersect to form a connection between a chamber 104 at one end of the plunger and a port 105 in the casing 100. The port 105 opens to the conduit 34 which leads to the reservoir. A port 106 joins the chamber 104 to the conduit 28 leading to the fluid motor 27. At the left end of the casing 100 is a plug 107 which closes that end of the casing except for a port 108 which connects the accumulator conduit 24 with a chamber 109. Between the chambers 104 and 109 is a partition 110 having a longitudinal passage 111 therethrough. Connected valve members 112 and 113 are respectively adapted to close the passage 111 through partition 110 and passage 102 through plunger 101. A spring 114 biases the connected valve members 112 and 113 toward the right and normally holds the valve member 112 against its seat to close passage 111. At the right end of plunger 101 is a thrust link 115 adapted to transmit force between the said plunger and the control lever 38, which is pivoted at 116 and is operable according to manipulation of the pedal 36.

Valve 26 comprises a shell 150 and an inner rotatable member 151 having a diametrical passage 152 extending from one side of the member 151 to the other, and a radial passage 153 extending from one side of the member 151 to the passage 152. When the valve member 151 is in the position shown the passage 152 connects the accumulator to motor 31 to actuate the said motor. When actuation of the motor 31 is no longer desired, the valve member 151 may be rotated until conduit 32 is connected through passage 153 and one side of passage 152 with conduit 35 and the reservoir. In this position, valve 26 allows fluid from motor 31 to exhaust to the reservoir.

Operation of my improved pressure system is along the following general lines. Fluid from the reservoir 10 is forced by the pump 12 into the accumulator 18, backflow being prevented by the one-way check valve 16. When the pressure on the accumulator fluid reaches a certain predetermined amount, the by-pass valve device or unloading valve 14 opens a by-pass and returns the pump fluid to the reservoir. When either of the valves 25 or 26 is actuated to operate its respective motor, fluid from the accumulator is connected through the said valve 25 or 26 to the motor. The use of pressure fluid to operate the motor or motors decreases the pressure in the accumulator. Whenever the decrease is sufficiently great the by-pass or unloading valve 14 will shut off the by-pass forcing the pumped fluid into the accumulator and build up pressure in the accumulator until the maximum is again reached.

The by-pass or unloading valve operation will now be specifically described. In the position shown in Figure 2, the ports 55 are closed to cut off the pump from the reservoir, so that the fluid from the pump will be forced into the accumulator. At the same time, the increasing accumulator pressure is being exerted against the ball valve member 57 the total pressure exerted being proportional to the area of the opening through the valve seat 58. The pressure exerted by the fluid is resisted by the spring 45 acting through the plunger 44. When the accumulator pressure is sufficient to overcome the spring pressure, ball valve member will be moved to the left compressing spring 45 and allowing fluid under accumulator pressure to enter chamber 43 and act against the face of the plunger 44 thus causing the plunger to continue its leftward movement. Once the ball valve 57 has been moved from seat 58, the pressure on the ball itself is neutralized. If the pressure of fluid from the accumulator has not a sufficiently large surface to work on after unseating the ball valve, the pressure of spring 45 will immediately reseat the ball valve. There will thus be a constant fluttering of the valve and the object of cutting off the pump from the accumulator will not be accomplished. It is necessary, not merely that the fluid pressure be able to act on the plunger face after unseating the ball valve, but also that the area of the plunger face be larger than the inner area of valve seat 58 in order to allow the ball valve to move all the way across chamber 43 and seat at 63. This is true because the force exerted by spring 45 will increase as the spring is compressed and greater force will be needed to continue leftward movement of the plunger. As the plunger moves under the direct influence of the fluid pressure, the ball is caused to follow up by the spring 62. When the ball finally seats against valve seat 63, the fluid pressure will be acting on an area equal to the mouth of valve seat 63, this area being larger than the plunger area. Consequently the effect of a given accumulator pressure will have been increased so that the ball will not be moved back toward the right until there is a substantial decrease in accumulator pressure. This is true in spite of the fact that the force of the spring 45 increases slightly due to compression.

When the plunger moves to the left it pushes outer sleeve 48, uncovering the openings or ports 55 in inner sleeve 52 and permitting fluid from the pump to pass through ports 55, chamber 54, the ports 53 into chamber 52 whence the said fluid may pass through port 56 and conduit 19 to the reservoir. So long as outer sleeve 48 is maintained in its leftward position, fluid from the pump is by-passed to the reservoir and the pressure in the accumulator is not increased. When, owing to utilization of accumulator fluid or to loss of pressure for some reason, there is a substantial decrease in accumulator pressure, the pressure exerted against the ball 57 by the accumulator fluid will be overcome by the pressure of spring 45 and the ball valve will be pushed off seat 63. Once the valve is moved off its leftward seat the accumulator pressure will be less effective since it is acting on the smaller area of the face of the plunger. Consequently, the force exerted by spring 45 will be sufficient to push the plunger 44 and ball 57 until the said ball seats at 58. The outer sleeve 48 has now moved sufficiently far to close the ports 55 and the pump is once again disconnected from the reservoir. The pump will now serve to build up accumulator pressure until that pressure is again sufficient to move ball valve 57 off the seat 58. It will be apparent that the one-way check valve 16 is automatically operative to disconnect pump 12 from the accumulator whenever the pump has been connected through ports 55 to the reservoir. Leakage past the plunger to the extent that it will relieve the pressure to the left of the ball with the ball on either seat is necessary for proper functioning of the regulator valve. This may be attained by a small restricted passage or groove on the plunger or by fitting plunger in its bore with a definite minimum clearance. Actually, the required clearance is so small that it would probably be impossible to manufacture the plunger and bore with a free sliding fit, without having a sufficient clearance to provide the theoretically necessary leakage.

The relief valve 21 is to be set or designed to open only if the accumulator pressure rises some predetermined amount above the maximum regulated pressure. In normal operation it will not be used. If the by-pass valve should stick while closed, the relief valve will relieve the pressure after it has gone somewhat over the normally regulated pressure. For instance, if the desired range of regulation is 1500–1800 lbs. per square inch, the relief valve might be designed to open at 2000 lbs. per square inch.

A condition might arise raising the accumulator pressure to the danger point if the entire system were left unused with the accumulator fully charged at 1800 lbs. while cold. A temperature increase would cause the gas pressure in the accumulator to rise. The relief valve will also alleviate this situation.

The control valve 25 operates as follows. Pressure exerted on the pedal 36 tends to move the pedal in a counterclockwise direction and thus to extend the spring 37 and pull the lever 38 in a counterclockwise direction about its pivot 116. This movement of the lever 38 is transmitted through the thrust link 115 to the plunger 101 tending to move the said plunger in a leftward direction. Moving to the left, the plunger contacts the valve member 113 closing passage 102 and disconnecting the fluid motor 27 from the reservoir. Further leftward movement of the plunger 101 pushes the valve member 112 off its seat, opening passage 111 and connecting the motor 27 to the accumulator. Fluid under pressure from the accumulator now moves into motor 27 to actuate brake shoes 29. At the same time the fluid under pressure exerts a force against the left face of plunger 101 tending to move the said plunger toward the right and thus transmitting reaction or feel to the operator through lever 38 and spring 37. The operator, if he wishes to exert further pressure on the lever 38 to continue the flow of fluid under pressure to motor 27, will increase his pressure on pedal 36 and move it further in a counterclockwise direction. Since the force exerted by the spring 37 depends in part upon the amount of its extension it will be necessary for the operator to progressively move the pedal 36 as he wishes to increase the force exerted by spring 37 on lever 38. Thus the operation of control valve 25 is position sensitive inasmuch as the amount of pressure admitted to motor 27 will be substantially proportional to the distance moved by pedal 36 away from its released position. When the reaction pressure exerted by the accumulator fluid against plunger 101 is equal to the pressure exerted by the operator on plunger 101, both passages 111 and 102 will be closed and valve 25 will be in lapped position. In order to release the brakes or to decrease the amount of pressure being exerted by fluid motor 27, the operator will lessen his pressure on pedal 36 with the result that accumulator pressure will force the plunger 101 to the left until valve 112 is allowed to close under the influence of spring 114 and valve 113 is allowed to open connecting the motor 27 to the reservoir and allowing return of fluid in the motor to the reservoir.

In order to present with maximum clarity the principles involved in my improved by-pass or unloading valve, it will be well to assume dimensions of the operating parts of the said valve and then to work out the actual pressures which are exerted. As shown in Figure 6, the letters A, B and C are used to indicate respectively the inner diameter of valve seat 58, the diameter of the face of plunger 44, and the inner diameter of the valve seat 63. Assume that it is desired to maintain the accumulator pressure between a minimum of 1500 lbs. per square inch and a maximum of 1800 lbs. per square inch. Assume further that the inner diameter of valve seat 58 represented by A=.375 inch. Then the area of the plane in which the accumulator pressure occurs when the ball valve is seated at $$58 = \frac{\pi}{4} \times .375^2 = .1105 \text{ square inches}$$

At a pressure of 1800 lbs. per square inch, the force tending to push the ball off seat 58 is .1105 × 1800=199 lbs. This force is opposed by friction of the parts which must move to allow the ball to move and by the load of the spring 45. Assume that the friction is 2 lbs. The force of the spring = 199 lbs. − 2 lbs. = 197 lbs.

Now assume the ball valve is seated at 63 and the pressure has dropped to 1500 lbs. per square inch. The spring load is acting to force the ball off the seat. The spring load in this position is the original spring load of 197 lbs. plus the product of the rate of the spring times the distance through which the ball and the plunger move when the ball goes from seat 58 to seat 63. Incidentally, it may be pointed out that this factor of the spring rate times the distance through which the spring is compressed should be kept as low as practical considerations permit. This should be done to permit regulation to closer limits of pressure or more positive action of the valve or combination of both. Assume ¼ inch (necessary to open by-pass valve) is the distance through which the parts move and 68 lbs. per inch is the rate of the spring (lowest rate determined by practical considerations of spring design). The spring load when the ball is seated at 63 = 197 lbs. + the product of 68 × ¼ = 214 lbs. This spring load must overcome the fluid pressure + the friction of the moving parts. Thus the ball will unseat as the accumulator falls to the low limit. The total pressure acting to hold the ball on seat 63 will be equal to the pressure acting on the ball plus the friction. Therefore the pressure acting on the ball will be the spring load 214 lbs. minus the friction 2 lbs. or 212 lbs. Since it is desired that the ball valve move back to the seat 58 when the accumulator pressure reaches the minimum of 1500 lbs. per square inch, the area of the valve seat 63 should equal the total pressure necessary to counteract the spring load divided by 1500 lbs. per square inch, the minimum pressure. The area of seat 63 therefore equals 212 ÷ 1500 = .1414 square inches. The inner diameter of valve seat 63, indicated by c, equals $$\sqrt{\frac{4}{\pi} \times .1414} = .424$$

As the ball leaves seat 63, the fluid pressure acts on the face of the plunger, which is indicated by the letter B in Figure 6. As the ball approaches seat 58, the spring load is falling off and approaching its original force of 197 lbs. To insure positive operation the spring load must be in excess of the fluid pressure plus friction as it moves toward seat 58 by said predeterminable amount. When the ball leaves seat 58 and moves toward seat 63, the high accumulator pressure acts on the plunger face and such pressure must be in excess of the spring load plus the friction by a certain predeterminable amount. For optimum conditions of operation in both directions, the excess of motivating force in one direction should equal the excess of motivating force in the other direction. The excess force when the ball is moving toward the right equals the spring load of 197 lbs. minus the fluid pressure acting on the plunger face when the accumulator pressure is at the minimum minus the frictional resistance. The excess force when the ball is moving toward the left equals the fluid pressure acting on the plunger face when the accumulator pressure is at the maximum minus the high spring load of 214 lbs. and minus the frictional resistance. But assuming that the excess force in both directions is equal, it can be determined that the desired diameter of the plunger face for the assumed dimensions of the other parts equals .398 inch. With a plunger of this diameter, the excess force when the ball is moving toward the left equals approximately 8.2 lbs. of the excess force when the ball is moving toward the right equals approximately 8 lbs. It will be understood that this excess force spoken of is the force which serves to continue the movement of the ball valve to one of its seats once it has left the other seat.

Figure 7:
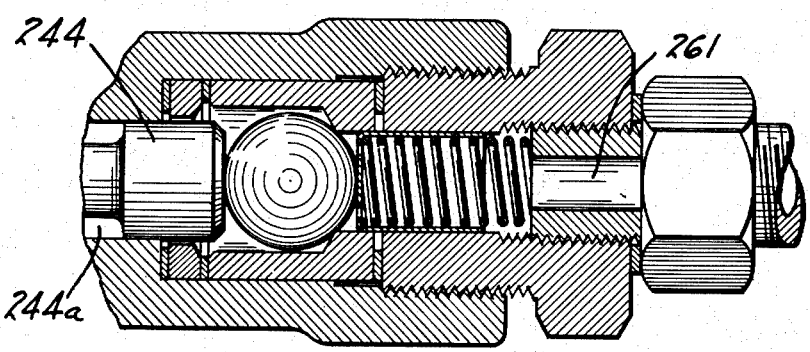
Figure 7 is a close-up showing in section certain important parts of the valve device of Figure 5.

In Figures 5 and 7, I have shown a by-pass valve device which is a modification of the device of Figures 2 and 6. Since the modified device is similar in many respects to the device of Figures 2 and 6, I have designated the parts in Figures 5 and 7 with numerals equal to 200 plus the numeral of similar parts in the device of Figures 2 and 6. The device of Figures 5 and 7 has a port 251 connected to the pump, a port 256 connected to the reservoir, and a port 261 connected to the accumulator. A plunger 244 is provided which serves also as a spool valve, having an annular circumferential groove 244a intermediate its ends. This groove is adapted to connect the pump port 251 with the reservoir port 256 when the plunger is moving to the left. It will be noted that an annular groove 244b is provided in the valve casing adjacent the body of the plunger 244. The purpose of this groove is to distribute the pump pressure around the body of the plunger so that the said pump pressure will not tend to push the plunger against one side of its support and thus create frictional resistance to plunger movement. The by-pass valve device of Figures 5 and 7 is provided with an adjustment feature. An externally threaded nut 246 is screwed into the valve casing to provide a support for the left end of the spring 245. The nut 246 can be screwed inwardly or outwardly of the casing to adjust the compression on the spring. A cover 249 is provided for the spring chamber and the cover is held in place by a screw 249a, which also serves as a locking device for nut 246.

A passage 244c is provided in the casing of the valve to connect the spring chamber with the fluid on the reservoir side of plunger 244. Likewise a passage 244d is provided through a force transmitting member 247 which houses one end of the spring 245 and bears against one end of the plunger 244. The two passages are provided to prevent any fluid which may leak past the plunger 244 or the member 247 from being trapped in the spring chamber. In hydraulic systems it is necessary that every chamber be either positively sealed or vented so that accumulations of fluid in the wrong places may not be allowed to hinder the operation of the system.

The operation of the device of Figures 5 and 7 is closely similar to the device of Figures 2 and 6 and it is therefore not believed necessary to insert a repetition of the previous description.

Although I have described certain specific embodiments of my invention, it will be appreciated that many other uses may be found to which my invention may be put. It is therefore my intention to limit the scope of the invention only by the terms of the appended claims.

I claim:
1. A regulator valve comprising a casing having an inlet and outlet port and having two valve seats of different effective areas, a pressure-responsive member movable from one seat to the other, fluid under pressure urging the pressure responsive device in one direction, a plunger integral with the pressure-responsive member and having an effective area intermediate the areas of the valve seats adapted to be subject at times to the direct pressure of the fluid for actuating said integral member and plunger, a resilient member urging the plunger and the pressure-responsive member in a direction opposed to the pressure of the fluid, and means controlled by the position of the plunger for alternately connecting and disconnecting the inlet and outlet ports.

2. In a regulator valve having inlet and outlet ports and having valve seats of different effective diameters, the combination of a movable valve control unit having a head portion adapted to seat at either of the valve seats and having a body portion of diameter intermediate the diameters of the valve seats, with fluid means for exerting unidirectional pressure against the valve control unit in an amount proportional to the diameter of one valve seat or to the diameter of the other valve seat or to the diameter of the body portion of the valve control unit, resilient means exerting a pressure against the valve control unit tending to resist the fluid pressure, and means controlled by the position of the valve control unit for alternately connecting and disconnecting the inlet and outlet ports.

3. A regulator valve for a fluid pressure system comprising a body member having inlet and outlet ports, two valve seats of different effective areas, a valve member interposed between the two seats and movable from one seat to the other, said valve member constructed and arranged to be connected to a source of variable pressure which tends to move said valve member off said one seat, a spring-urged element constructed and arranged to move said valve member toward said one seat against the variable pressure, the arrangement of the valve member is such that it is moved off said one seat onto said other seat against the spring-urged element when the variable pressure is at a predetermined upper limit and moved off said other seat onto said one seat in response to the spring force acting on said element when the variable pressure is at a predetermined lower limit, and means in said regulator valve affected by movement of said valve member from said one seat for controlling flow between the inlet and outlet ports.

4. A regulator valve for a fluid pressure system comprising a body member having inlet and outlet ports, two valve seats of different effective areas, a valve member interposed between the two seats and movable from one seat to the other, said valve member constructed and arranged to be connected to a source of variable pressure which tends to move said valve member off said one seat, a spring-urged element constructed and arranged to move said valve member toward said one seat against the variable pressure, the arrangement of the valve member is such that it is moved off said one seat onto said other seat against the spring-urged element when the variable pressure is at a predetermined upper limit and moved off said other seat onto said one seat in response to the spring force acting on said element when the variable pressure is at a predetermined lower limit, and means in said regulator valve affected by movement of said valve member from said one seat for controlling flow between the inlet and outlet ports, said means including a valve normally spring closed to cut off flow between the inlet and outlet ports but openable when the variable pressure is at said predetermined upper limit.

5. A regulator valve for a fluid pressure system comprising a body member having inlet and outlet ports, two valve seats of different effective areas, a valve member interposed between the two seats and movable from one seat to the other, said valve member constructed and arranged to be connected to a source of variable pressure which tends to move said valve member off said one seat, a spring-urged element constructed and arranged to move said valve member toward said one seat against the variable pressure, the arrangement of the valve member is such that it is moved off said one seat onto said other seat against the spring-urged element when the variable pressure is at a predetermined upper limit and moved off said other seat onto said one seat in response to the spring force acting on said element when the variable pressure is at a predetermined lower limit, means in said regulator valve affected by movement of said valve member from said one seat for controlling flow between the inlet and outlet ports, and adjusting means for varying the spring force of said spring, whereby the upper and lower limit pressures may be varied.

6. A regulator valve for a fluid pressure system comprising a body member having inlet and outlet ports, two valve seats of different effective areas, a valve member interposed between the two seats and movable from one seat to the other, said valve member constructed and arranged to be connected to a source of variable pressure which tends to move said valve member off said one seat, a spring biased plunger constructed and arranged to have one end bearing against said valve member to move the same toward said one seat against the variable pressure, the arrangement of the valve member is such that it is moved off said one seat onto said other seat against the spring biased plunger when the variable pressure is at a predetermined upper limit and moved off said other seat onto said one seat in response to the spring force acting on said plunger when the variable pressure is at a predetermined lower limit, and means in said regulator valve affected by movement of said valve member from said one seat for controlling flow between the inlet and outlet ports.

7. A regulator valve for a fluid pressure system comprising a body member having inlet and outlet ports, two valve seats of different effective areas, a valve member interposed between the two seats and movable from one seat to the other, said valve member constructed and arranged to be connected to a source of variable pressure which tends to move said valve member off said one seat, a spring biased plunger constructed and arranged to have one end bearing against said valve member to move the same toward said one seat against the variable pressure, the end of the plunger having an effective area intermediate the areas of the valve seats and on which the variable pressure acts when the valve member is off said one seat, the arrangement of the valve member is such that it is moved off said one seat onto said other seat against the spring biased plunger when the variable pressure is at a predetermined upper limit and moved off said other seat onto said one seat in response to the spring force acting on said plunger when the variable pressure is at a predetermined lower limit, and means in said regulator valve affected by movement of said valve member from said one seat for controlling flow between the inlet and outlet ports.

8. A regulator valve for a fluid pressure system comprising a body member having inlet and outlet ports therein, two valve seats of different effective areas, a pressure-responsive device interposed between the seats and movable from one seat to the other, said pressure-responsive device constructed and arranged to be connected to a source of variable pressure which tends to move said pressure-responsive device off said one seat and onto said other seat, a spring biased plunger constructed and arranged to bear against said pressure responsive device to tend to move it off said other seat and onto said one seat against the variable pressure, and means controlled by the seating and unseating of said device for controlling flow at the outlet port, said means including inner and outer sleeve members having ports therein arranged to register at times when the pressure-responsive device is moved from said one seat by the variable pressure after it has reached a predetermined upper limit to thereby communicate the outlet port with the inlet port.

9. A regulator valve for a fluid pressure system comprising a casing having an inlet port and outlet port and two valve seats of different effective areas, a pressure-responsive device interposed between the seats and movable from one seat to the other, said pressure responsive device adapted to be connected to a source of variable pressure urging the device in one direction, a plunger constructed and arranged to have an end with a diameter intermediate the diameters of the valve seats and bearing against the pressure responsive device and subject at times to the variable pressure, a spring like member urging the plunger and the pressure responsive device in the opposite direction against the variable pressure, and means controlled by the position of said plunger for controlling flow between the inlet and outlet ports.

10. A regulator valve for a fluid pressure system comprising a casing having an inlet port and outlet port and two valve seats, a pressure-responsive device interposed between the valve seats and movable from one seat to the other, said pressure-responsive device adapted to be connected to a source of variable pressure for urging the device from one seat to the other, said pressure-responsive device and said valve seats being so constructed and arranged that for a given unit pressure the total force of the variable pressure acting on the pressure-responsive device is different when the device is at one seat than when it is at the other seat, and a combined spool valve and plunger device bearing against the pressure-responsive device and having a face which is subject to the variable pressure while the pressure-responsive device is unseated from said one seat, said pressure subjected face of the plunger device having an area such that the force exerted against it by the variable pressure for a given unit pressure is greater than the force exerted against the pressure-responsive device while it is at said one seat and less than the force exerted against it while it is at the other seat, said spool valve serving to connect the inlet and outlet ports according to the position of the plunger.

11. A regulator valve for a fluid pressure system comprising a body having inlet and outlet ports, two valve seats of different effective areas, a valve member interposed between the two seats and movable from one seat to the other, said valve member constructed and arranged to be subjected to a source of variable pressure which tends to move said valve member off said one seat, means including a spring arranged with respect to said valve member to urge the same toward said one seat against the variable pressure, the arrangement of the valve member is such that it is moved off said one seat onto said other seat against the force of said spring when the variable pressure is at a predetermined upper limit and moved off said other seat onto said one seat in response to the spring force when the variable pressure is at a predetermined lower limit, and means in said regulator valve actuable for controlling the flow between the inlet and outlet ports, the unseating of said valve member from said one seat being effective to actuate said last mentioned means.

12. A regulator valve for a fluid pressure system comprising a body having inlet and outlet ports, two valve seats of different effective areas, a valve member interposed between the two seats and movable from one seat to the other, said valve member adapted to be subjected to a source of variable pressure which tends to move said valve member off said one seat, means acting on the side of said valve member opposite said one seat tending to urge the valve member toward said one seat against the variable pressure, the arrangement of the valve member being such that it is moved off said one seat onto said other seat against said means when the variable pressure is at a predetermined upper limit and moved off said other seat onto said one seat in response to said means when the variable pressure is at a predetermined lower limit, and means in said regulator valve to effect the control of flow between the inlet and outlet ports in accordance with the position of said valve member with respect to said two seats.

RICHARD T. BURNETT.

REFERENCES CITED

The following references are of record in the file of this patent:

UNITED STATES PATENTS

| Number | Name | Date |
| --- | --- | --- |
| 703,220 | White | June 24, 1902 |
| 725,707 | Hoffman | Apr. 21, 1903 |
| 1,110,567 | McAulay | Sept. 15, 1914 |
| 1,135,341 | Wilcox | Apr. 13, 1915 |
| 1,135,579 | Hansen | Apr. 13, 1915 |
| 1,141,015 | Silvestri | May 25, 1915 |
| 1,147,286 | Welch | July 20, 1915 |
| 1,314,746 | Hayes | Sept. 2, 1919 |
| 1,451,481 | Vincent | Apr. 10, 1923 |
| 1,543,841 | Grigoleit | June 30, 1925 |
| 1,612,639 | Metzgar | Dec. 28, 1926 |
| 1,836,416 | Waber | Dec. 15, 1931 |
| 1,965,126 | Willson | July 3, 1934 |
| 2,004,733 | Montgomery | June 11, 1935 |